US012540745B2

(12) United States Patent
Sakai et al.

(10) Patent No.: US 12,540,745 B2
(45) Date of Patent: Feb. 3, 2026

(54) CONTROL DEVICE, HEAT EXCHANGE SYSTEM, AND RECORDING MEDIUM RECORDING PROGRAM

(71) Applicant: Hitachi-Johnson Controls Air Conditioning, Inc., Tokyo (JP)

(72) Inventors: Kyohei Sakai, Tokyo (JP); Mutsumi Morooka, Tokyo (JP); Aya Kinoshita, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 655 days.

(21) Appl. No.: 17/890,316

(22) Filed: Aug. 18, 2022

(65) Prior Publication Data

US 2023/0054461 A1    Feb. 23, 2023

(30) Foreign Application Priority Data

Aug. 19, 2021 (JP) .................................. 2021-133886

(51) Int. Cl.
*F24F 11/63* (2018.01)
(52) U.S. Cl.
CPC .................................... *F24F 11/63* (2018.01)
(58) Field of Classification Search
CPC ..................................................... F24F 11/63
See application file for complete search history.

(56) References Cited

U.S. PATENT DOCUMENTS

2009/0015867 A1* 1/2009 Ukegawa .................. G06F 8/65
358/1.16
2016/0112252 A1* 4/2016 Notari ................. H04L 41/0843
709/221

(Continued)

FOREIGN PATENT DOCUMENTS

CN       107407493 A    11/2017
JP     2009-129314 A     6/2009

(Continued)

OTHER PUBLICATIONS

Chinese Office Action received in corresponding Chinese Application No. 202210993833.7 dated Nov. 19, 2025.

*Primary Examiner* — Mark A Connolly
(74) *Attorney, Agent, or Firm* — MATTINGLY & MALUR, PC

(57) ABSTRACT

A controller includes a first storage storing setting information used for operation control of a heat exchange system that exchanges heat between fluid and a heat medium. The controller executes operation control using the setting information. A communicator includes a second storage medium storing setting information used for the operation control, the communicator communicates with external equipment, the controller and the communicator are mounted on an identical outdoor unit, an identical indoor unit, or an identical central control panel. The controller and the communicator execute synchronization processing between the setting information stored in the first storage and the setting information stored in the second storage, and in a case where the setting information stored in the second storage has been changed in response to a request from the external equipment, the communicator transmits the changed setting information to the controller in the synchronization processing.

12 Claims, 7 Drawing Sheets

(56) References Cited

U.S. PATENT DOCUMENTS

| | | | |
|---|---|---|---|
| 2016/0211985 A1* | 7/2016 | Castillo | F24F 11/62 |
| 2021/0182050 A1* | 6/2021 | Tsuji | F24F 11/64 |

FOREIGN PATENT DOCUMENTS

| | | |
|---|---|---|
| JP | 2013-234763 A | 11/2013 |
| JP | 2019-74230 A | 5/2019 |
| WO | 2008/65923 A1 | 6/2008 |

* cited by examiner

CONTROL DEVICE, HEAT EXCHANGE SYSTEM, AND RECORDING MEDIUM RECORDING PROGRAM

CROSS-REFERENCE TO RELATED APPLICATION

This application is based on Japanese Patent Application No. 2021-133886 filed with the Japan Patent Office on Aug. 19, 2021, the entire content of which is hereby incorporated by reference.

BACKGROUND

1. Technical Field

One aspect of the present disclosure relates to a control device configured to control operation of a heat exchange system, a heat exchange system, and a recording medium recording a program causing a computer to execute control of a heat exchange system.

2. Related Art

In an air-conditioning device, setting information such as a capacity including a horsepower, the type of refrigerant to be used, and the amount of refrigerant in the air-conditioning device is stored in an outdoor control board included in an outdoor unit. Such setting information is, upon operation control, used together with information acquired by various sensors. The operation control includes, for example, the control of the number of rotations of a compressor included in the outdoor unit and the degree of opening of an expansion valve.

In a case where the outdoor control board has been replaced due to, e.g., breakdown thereof, it takes time and effort to input, e.g., the setting information to a new outdoor control board again after replacement. Moreover, in many cases, a set state before breakdown is unknown. Further, the setting is manually made, and for this reason, erroneous setting is caused in some cases.

Thus, in a technique proposed in, e.g., JP-A-2013-234763, setting information is saved in a detachable storage medium before an abnormality is caused in a board. In a case where the abnormality is caused in the board, the storage medium is attached to a new board, and the setting information is sent from the storage medium to the new board. In this manner, a state before board replacement is recovered.

SUMMARY

A control device includes: a controller including a first storage medium configured to store setting information used for operation control of a heat exchange system configured to exchange heat between fluid and a heat medium, the controller being configured to execute the operation control by use of the setting information; and a communicator including a second storage medium configured to store setting information used for the operation control, the communicator being configured to communicate with external equipment. The controller and the communicator are mounted on an identical outdoor unit, an identical indoor unit, or an identical central control panel. The controller and the communicator execute synchronization processing between the setting information stored in the first storage medium and the setting information stored in the second storage medium. In a case where the setting information stored in the second storage medium has been changed in response to a request from the external equipment, the communicator transmits the changed setting information to the controller in the synchronization processing.

BRIEF DESCRIPTION OF DRAWINGS

FIG. 5 is a flowchart showing the flow of setting processing upon power-on;

DETAILED DESCRIPTION

Figure 1:
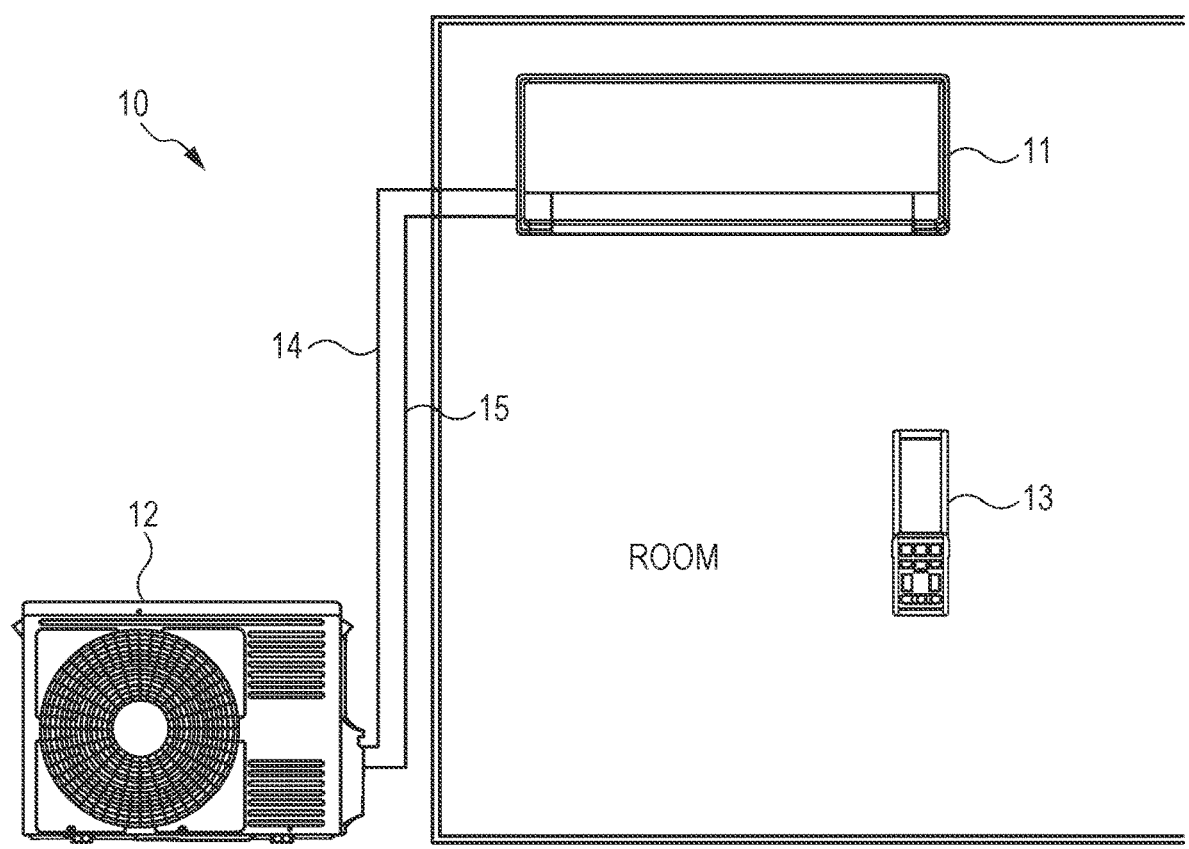
FIG. 1 shows a configuration example of an air-conditioning device as one example of a heat exchange system.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

However, in the above-described typical technique, the setting information is not transmitted from the storage medium to the board as long as the setting information is not an initial value. For this reason, even in a case where the setting information needs to be changed after replacement of the board (a controller), it is difficult to change the setting information from a component other than the controller.

A control device (the present control device) according to one aspect of the present disclosure includes: a controller having a first storage medium configured to store setting information used for operation control of a heat exchange system configured to exchange heat between fluid and a heat medium, the controller being configured to execute the operation control by use of the setting information; and a communicator having a second storage medium configured to store setting information used for the operation control, the communicator being configured to communicate with external equipment. The controller and the communicator execute synchronization processing between the setting information stored in the first storage medium and the setting information stored in the second storage medium. In a case where the setting information stored in the second storage medium has been changed in response to a request from the external equipment, the communicator transmits the changed setting information to the controller in the synchronization processing.

According to the present control device, the setting information can be changed from a component other than the controller.

A heat exchange system (the present heat exchange system) according to the present embodiment is a system configured to exchange heat between fluid and a heat medium. In the present heat exchange system, while the heat medium is circulating in the closed system, heat is exchanged between the taken fluid and the circulating heat medium. Accordingly, the taken fluid is heated or cooled and discharged. The fluid may be gas such as air or liquid such as water or a solution. The heat exchange system includes a compressor, a heat exchanger, and an expansion valve for heating or cooling the heat medium in the system. Such a heat exchange system including the compressor, the heat exchanger, and the expansion valve may include, for example, an air-conditioning device, a chiller (a coolant circulation device), and a refrigerator.

FIG. 1 shows a configuration example of an air-conditioning device 10 as one example of the present heat exchange system. That is, in the present embodiment, the air-conditioning device 10 will be described as an example of the present heat exchange system.

The air-conditioning device 10 includes an indoor unit 11 placed in a space (a room) where air-conditioning is performed, an outdoor unit 12 placed outside the room, and a remote controller 13 to be operated by a user. The air-conditioning device 10 causes refrigerant as a heat medium to circulate between the indoor unit 11 and the outdoor unit 12 to exchange heat between air in the room and the refrigerant, thereby performing air-conditioning. Thus, the indoor unit 11 and the outdoor unit 12 are connected to each other via two refrigerant pipes 14, 15 for circulating refrigerant.

Each of the indoor unit 11 and the outdoor unit 12 may include two or more units. Two or more indoor units 11 may be connected to a single outdoor unit 12. Hydrofluorocarbon (HFC) may be used as refrigerant. The types of HFC may include, for example, R-410A and R-32.

The indoor unit 11 wirelessly communicates with the remote controller 13 via, e.g., infrared light, thereby receiving various signals such as an operation command, a stop command, a set temperature change command, and an operation mode change command from the remote controller 13. The indoor unit 11 is connected to the outdoor unit 12 via a communication line, and air-conditions the inside of the room in cooperation with the outdoor unit 12.

After receiving the operation command from the remote controller 13, the indoor unit 11 is started, and instructs the outdoor unit 12 to start. After start, the outdoor unit 12 adjusts the number of rotations of a compressor, the degree of opening of an expansion valve, and the like and controls a refrigerant circulation amount and the like such that an indoor temperature reaches a set temperature.

Figure 2:
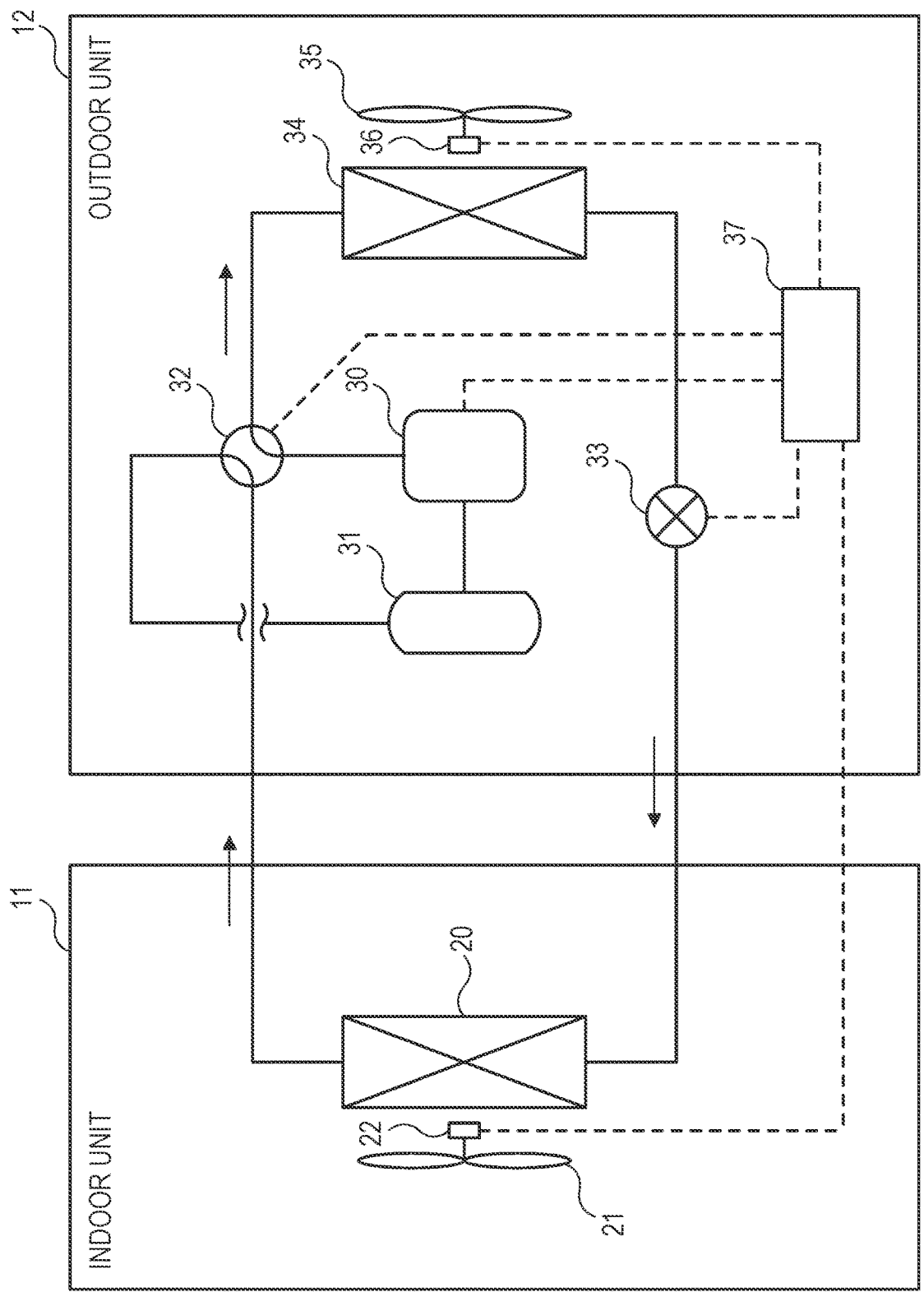
FIG. 2 is a diagram for describing a refrigerant circuit of the air-conditioning device.

A refrigerant circuit of the air-conditioning device 10 will be briefly described with reference to FIG. 2. Arrows shown in FIG. 2 indicate the flow of refrigerant in air-cooling operation. Hereinafter, movement in the air-cooling operation will be mainly described. Note that in air-heating operation, the direction of the flow of refrigerant is opposite to the direction of the arrows.

The indoor unit 11 includes an indoor heat exchanger 20, an indoor fan 21, and an indoor fan drive motor 22. The indoor fan 21 is driven by the indoor fan drive motor 22, and takes air from the room to send the air to the indoor heat exchanger 20. The indoor heat exchanger 20 has a heat transfer pipe in which refrigerant flows, and is configured such that the taken air contacts a surface of the heat transfer pipe to exchange heat with the heat transfer pipe. After having exchanged heat in the indoor heat exchanger 20, the air is discharged into the room.

In addition, the indoor unit 11 may include, for example, various sensors for measuring the indoor temperature and the like and an expansion valve.

The outdoor unit 12 includes a compressor 30, an accumulator 31, a four-way valve 32, an expansion valve 33, an outdoor heat exchanger 34, an outdoor fan 35, and an outdoor fan drive motor 36. The compressor 30 is driven by a compressor drive motor, and compresses low-pressure gas refrigerant to discharge high-pressure gas refrigerant. The accumulator 31 is a container for storing liquid upon liquid back in a transient period, and adjusts refrigerant to a moderate dryness. The dryness is the percentage of vapor in wet vapor, the percentage indicating a mixed state of vapor and liquid microdroplets.

The four-way valve 32 is a valve configured to switch a refrigerant flow path according to an operation state (an operation mode) of the air-conditioning device 10. The operation mode includes, for example, an air-cooling mode, an air-heating mode, and a ventilation mode. The expansion valve 33 is a valve configured to depressurize and expand high-pressure refrigerant. The outdoor fan 35 is driven by the outdoor fan drive motor 36, and takes air from the outside of the room to send the air to the outdoor heat exchanger 34. As in the indoor heat exchanger 20, the outdoor heat exchanger 34 has a heat transfer pipe in which refrigerant flows, and is configured such that the taken air contacts a surface of the heat transfer pipe to exchange heat with the heat transfer pipe. After having exchanged heat in the outdoor heat exchanger 34, the air is discharged to the outside of the room.

The outdoor unit 12 further includes a control device 37. The control device 37 is connected to the compressor 30, the four-way valve 32, the expansion valve 33, the indoor fan drive motor 22, and the outdoor fan drive motor 36, thereby controlling these members. Specifically, such control includes, for example, control of the number of rotations of the compressor 30, the degree of opening of the expansion valve 33, the number of rotations of the indoor fan drive motor 22, and the number of rotations of the outdoor fan drive motor 36. For controlling these members, various sensors are also attached to the outdoor unit 12. The control device 37 controls these members based on information detected by various sensors.

In the air-cooling operation, the indoor heat exchanger 20 is utilized as an evaporator, and the outdoor heat exchanger 34 is utilized as a condenser. Thus, the control device 37 causes refrigerant sealed in the system to circulate through the compressor 30, the outdoor heat exchanger 34, the expansion valve 33, the indoor heat exchanger 20, the four-way valve 32, the accumulator 31, and the compressor 30 in this order, as indicated by the arrows.

The compressor 30 compresses low-temperature low-pressure gas refrigerant (refrigerant gas) to discharge high-temperature high-pressure refrigerant gas. The outdoor heat exchanger 34 exchanges heat between the refrigerant gas and air outside the room, thereby cooling and condensing the refrigerant gas. The expansion valve 33 depressurizes the refrigerant to evaporate part of the refrigerant. Thus, the refrigerant is, in a mixed state of gas and liquid, supplied to the indoor unit 11. The control device 37 adjusts the degree of opening of the expansion valve 33 such that the amount of liquid in the refrigerant reaches a moderate amount.

The indoor heat exchanger 20 exchanges heat between the refrigerant and air in the room, thereby evaporating all condensed liquid refrigerant and returning such refrigerant as refrigerant gas to the outdoor unit 12. The refrigerant gas having returned from the indoor heat exchanger 20 is sent to the accumulator 31 through the four-way valve 32, and is returned to the compressor 30.

The control device 37 is mounted on the outdoor unit 12. Note that the present disclosure is not limited to above, and the control device 37 may be mounted on the indoor unit 11 or be mounted on other members such as a central control panel (not shown).

Operation control of the air-conditioning device 10 by the control device 37 varies according to the horsepower of the air-conditioning device 10, the type of refrigerant, the amount of refrigerant sealed in the system, and the like. This is because the horsepower influences an air-conditioning capacity and the type of refrigerant and the amount of refrigerant sealed influence a heat exchange efficiency. These types of information are stored as setting information such as a model setting in a storage medium included in the control device 37. Upon the operation control, the control device 37 reads the setting information from the storage medium, sets, as internal data, the setting information together with data received from the indoor unit 11 and sensor data acquired from the sensors of the outdoor unit 12, and uses such data for the operation control.

The data received from the indoor unit 11 and the sensor data include, for example, the indoor set temperature, the indoor temperature, heat transfer pipe surface temperatures (refrigerant temperatures) of the indoor heat exchanger 20 and the outdoor heat exchanger 34, refrigerant gas suction temperature, suction pressure, discharge temperature, and discharge pressure of the compressor 30.

Typically, the control device 37 is configured as an outdoor control board, and the setting information is stored in a storage medium included in the outdoor control board. The setting information is reflected in the internal data, and is used for the operation control of the air-conditioning device 10. For example, if the outdoor control board is broken down, it is difficult to read the setting information from the storage medium. For this reason, after the outdoor control board has been replaced with a new outdoor control board, the setting information before, e.g., breakdown is input again. This process takes time and effort. If the setting information before, e.g., breakdown is not recollected, it is difficult to input such setting information. As a result, it is difficult to easily recover the setting information.

Figure 3:
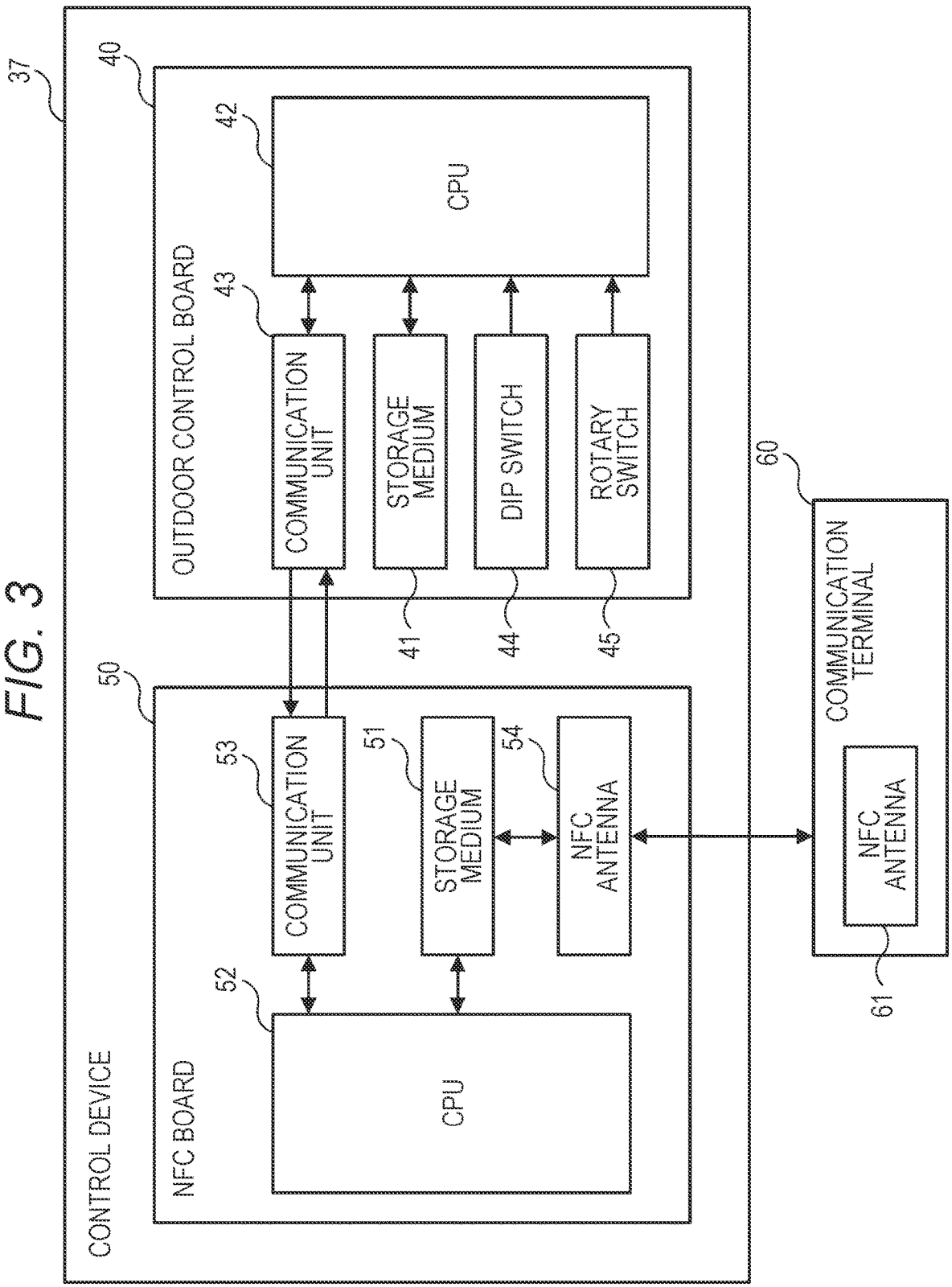
FIG. 3 shows a configuration example of a control device included in an outdoor unit and configured to control operation.

For these reasons, in the present embodiment, the control device 37 has a configuration as shown in FIG. 3. FIG. 3 shows a configuration example of the control device according to the present embodiment. The control device 37 has an outdoor control board 40 and a near field communication (NFC) board 50 as an outdoor sub-board. The outdoor control board 40 functions as a controller configured to control operation of the air-conditioning device 10 by means of the setting information, and includes a storage medium 41 as a first storage medium configured to store the setting information, a central processing unit (CPU) 42, a communication unit 43, a DIP switch 44, and a rotary switch 45.

The outdoor control board 40 and/or the CPU 42 are/is one example of a computer. The CPU 42 executes a program stored in the storage medium 41, thereby controlling operation of the indoor fan drive motor 22, the compressor 30, the four-way valve 32, the expansion valve 33, the outdoor fan drive motor 36, and the like of the air-conditioning device 10 and acquiring information from the DIP switch 44 and the rotary switch 45. Moreover, the CPU 42 and the NFC board 50 together execute synchronization processing via the communication unit 43. Note that such processing is not limited to execution by the program and may be executed by, e.g., a dedicated circuit.

The communication unit 43 is a communication I/F, and is connected to the NFC board 50 via a transmission line to perform serial communication with the NFC board 50. Note that communication between the outdoor control board 40 and the NFC board 50 is not limited to wired communication via the transmission line and may be wireless communication such as WiFi (the registered trademark). The DIP switch 44 and the rotary switch 45 are small switches for setting various types of setting information, and are one example of one or more switches capable of setting the setting information used for the above-described operation control of the air-conditioning device 10.

The NFC board 50 functions as a communicator, and includes a storage medium 51 as a second storage medium configured to store the setting information, a CPU 52, a communication unit 53, and an NFC antenna 54.

The NFC board 50 and/or the CPU 52 are/is one example of a computer. The CPU 52 executes a program stored in the storage medium 51, thereby accepting a change in the setting information via the NFC antenna 54, changing the setting information stored in the storage medium 51, and executing the synchronization processing in cooperation with the CPU 42. Note that such processing is not limited to execution by the program and may be executed by, e.g., a dedicated circuit.

The communication unit 53 is a communication I/F, and is connected to the communication unit 43 of the outdoor control board 40 via the transmission line to perform serial communication with the communication unit 43. The NFC antenna 54 performs near field communication with external equipment such as a smartphone or a tablet terminal, and receives a request for changing the setting information from the external equipment. Thus, the external equipment is provided with a dedicated application for changing the setting information and transmitting the change request. A communication terminal 60 shown in FIG. 3 is one example of the external equipment. The communication terminal 60 includes an NFC antenna 61, and is configured to perform NFC communication with the NFC antenna 54 included in the NFC board 50.

In the NFC board 50, the CPU 52 exchanges information with the communication terminal 60 via the NFC antenna 54 and the storage medium 51 by NFC communication. The exchanged information may be stored in the storage medium 51.

Unlike the outdoor control board 40, the NFC board 50 does not control the air-conditioning device 10. The communication unit 53 is connected to the communication unit 43 of the outdoor control board 40, but does not control operation of the indoor fan drive motor 22, the compressor 30, the four-way valve 32, the expansion valve 33, the outdoor fan drive motor 36, and the like of the air-conditioning device 10.

The setting information transmitted from the communication terminal 60 is stored in the storage medium 51. Thus, the latest setting information transmitted from the communication terminal 60 is stored in the storage medium 51, except that the setting has been changed using the DIP switch 44 and the rotary switch 45.

In NFC communication, near field communication within several tens of centimeters is allowed. The NFC board 50 is arranged at a position close to the outside of the air-conditioning device 10 so that the setting can be changed from the outside without the need for opening the air-conditioning device 10. On the other hand, the outdoor control board 40 has no such position limitation in NFC communication, and therefore, can be arranged at an optimal position for controlling each unit of the air-conditioning device 10.

During power distribution, the CPU 42 of the outdoor control board 40 and the CPU 52 of the NFC board 50 execute the setting information synchronization processing between the outdoor control board 40 and the NFC board 50 in a case where the setting information has been changed or on a regular basis even in a case where there has been no setting change. Such synchronization processing is the processing of synchronizing the setting information stored in the storage medium 41 and the setting information stored in the storage medium 51 with each other. The setting information in the outdoor control board 40 may be changed by, e.g., the DIP switch 44. Moreover, the setting information in the NFC board 50 may be changed using the communication terminal 60. Thus, in response to switching of a switch such as the DIP switch 44 or a request from the communication terminal 60, the CPU 42 and the CPU 52 sense that the setting information has been changed. A time interval in the case of executing the synchronization processing on a regular basis may be any time interval as long as proper synchronization processing can be executed.

Figure 4A:
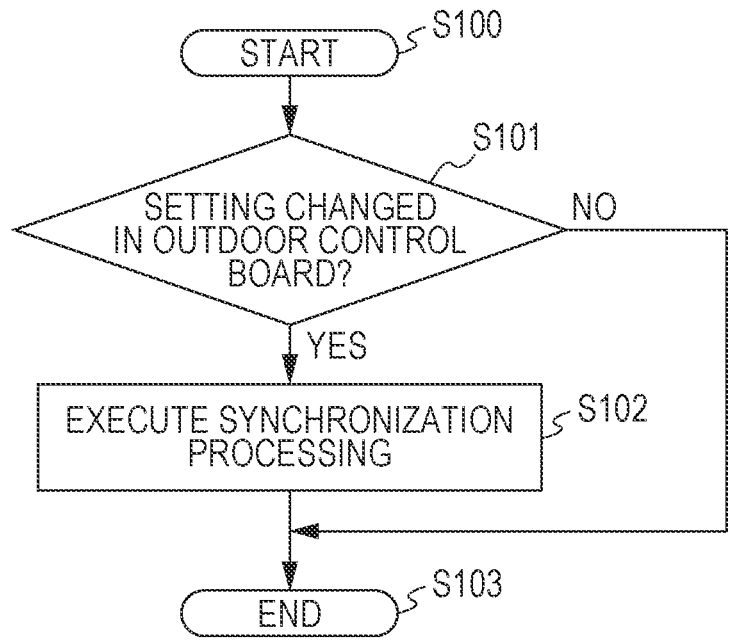
FIGS. 4A to 4B are flowcharts showing the flow of synchronization processing during power distribution.
Figure 4B:
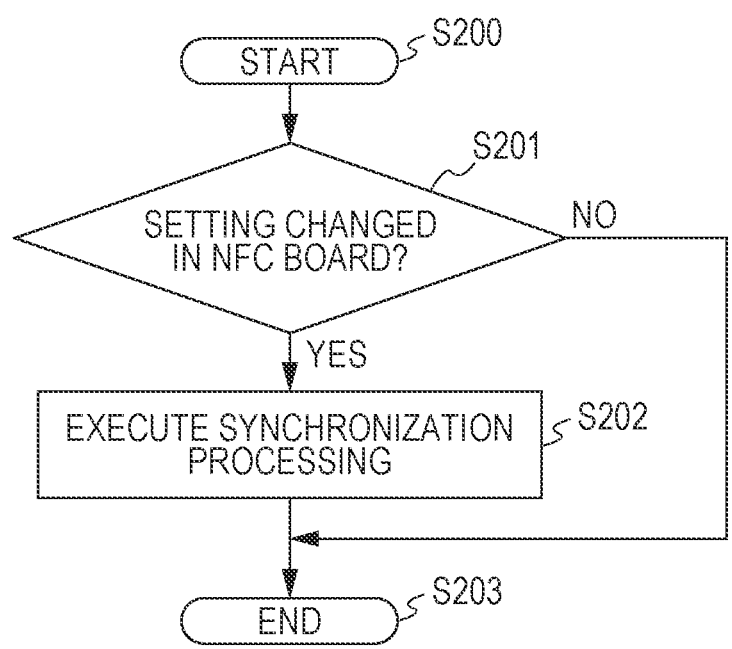

The synchronization processing during power distribution will be described with reference to FIGS. 4A and 4B. In response to a change in the setting information, the synchronization processing is performed in such a manner that information in a storage medium of a subject board is changed and the changed setting information is transmitted to other boards. FIG. 4A shows the synchronization processing executed by the CPU 42 of the outdoor control board 40. FIG. 4B shows the synchronization processing executed by the CPU 52 of the NFC board 50.

First, the synchronization processing executed by the outdoor control board 40 will be described with reference to FIG. 4A. The CPU 42 starts the processing from Step 100, and in Step 101, determines whether or not the setting has been changed in the outdoor control board 40. The setting in the outdoor control board 40 is changed in such a manner that the setting information stored in the storage medium 41 is changed by switching of the DIP switch 44 or the rotary switch 45. In a case where it is determined that the setting has not been changed, the processing proceeds to Step 103, and the CPU 42 ends the processing.

On the other hand, in a case where it is determined in Step 101 that the setting has been changed, the processing proceeds to Step 102, and the CPU 42 executes the synchronization processing. The synchronization processing is performed by the CPU 42 in such a manner that the changed setting information is transmitted to the NFC board 50 via the communication unit 43. In the NFC board 50, the CPU 52 receives the changed setting information via the communication unit 53, and changes the setting information in the storage medium 51. That is, the setting information (the changed setting information) stored in the storage medium 41 is transmitted from the storage medium 41 of the outdoor control board 40 to the storage medium 51 of the NFC board 50. Accordingly, the setting information stored in the storage medium 41 and the setting information stored in the storage medium 51 become the same information. After the end of the synchronization processing, the processing proceeds to Step 103, and the CPU 42 ends the processing.

Next, the synchronization processing executed by the NFC board 50 will be described with reference to FIG. 4B. The CPU 52 starts the processing from Step 200, and in Step 201, determines whether or not the setting has been changed in the NFC board 50. The setting information in the NFC board 50 is changed using the dedicated application of the communication terminal 60. That is, the setting information in the NFC board 50 is changed in such a manner that a setting information change request is transmitted to the NFC board 50 via the NFC antenna 61. The NFC board 50 receives such a request via the NFC antenna 54. The CPU 52 interprets the request, and based on the interpreted contents, changes the setting information stored in the storage medium 51. Note that the dedicated application may also transmit data such as operation information on the air-conditioning device 10 to the NFC board 50. As described above, Step 201 is the step of changing the setting information stored in the storage medium 51 in response to the request from the communication terminal 60.

In a case where it is determined in Step 201 that the setting has not been changed, the processing proceeds to Step 203, and the CPU 52 ends the processing.

On the other hand, in a case where it is determined in Step 201 that the setting has been changed, the processing proceeds to Step 202, and the CPU 52 executes the synchronization processing. The synchronization processing is performed by the CPU 52 in such a manner that the changed setting information is transmitted to the outdoor control board 40 via the communication unit 53. In the outdoor control board 40, the CPU 42 receives the changed setting information via the communication unit 43, and changes the setting information in the storage medium 41. That is, in a case where the setting information stored in the storage medium 51 has been changed in response to the request from the communication terminal 60, the NFC board 50 transmits the changed setting information to the outdoor control board 40 in the synchronization processing. Accordingly, the setting information stored in the storage medium 41 and the setting information stored in the storage medium 51 become the same information. After the end of the synchronization processing, the processing proceeds to Step 203, and the CPU 52 ends the processing.

The CPU 42 or the CPU 52 may sense a change in the setting information and execute the synchronization processing in a case where the setting information has been changed, or may execute the synchronization processing on a regular basis. In the example shown in FIG. 3, each of the CPU 42 and the CPU 52 determines whether or not the setting has been changed, and executes the synchronization processing. Instead, either one of the CPU 42 or the CPU 52 may be a master, and may acquire the setting information from the other one of the CPU 42 or the CPU 52 to compare the acquired setting information and the setting information in the master. In a case where these pieces of setting information are different from each other, the synchronization processing may be executed after determination on which piece of setting information is to be changed.

For example, the date of updating may be, as attribute information, assigned to the setting information. The above-described master may refer to the date of updating, thereby determining which one of the acquired setting information or the setting information in the master is to be updated. Note that the attribute information may be assigned to each setting item. The master may compare the latest date of updating in the attribute information assigned to each setting item, thereby determining which piece of setting information is to be updated.

The NFC board 50 may execute other types of processing while connected to the communication terminal 60. For example, in a case where the communication terminal 60 can change the operation mode and/or the set temperature, the NFC board 50 may acquire the operation information on the air-conditioning device 10, such as the operation mode, from the communication terminal 60.

In the present embodiment, the synchronization processing is executed, and therefore, the setting information stored in the outdoor control board 40, the information set by the DIP switch 44 and the rotary switch 45, and the setting information stored in the NFC board 50 are the same information. However, in a case where, e.g., the outdoor control board 40 is broken down and is replaced with, e.g., a new outdoor control board 40, the setting information in the outdoor control board 40 is, immediately after replacement, in, e.g., a state at the time of shipping from a factory. For this reason, such information is not the same information as, e.g., the setting information stored in the NFC board 50.

In a case where the outdoor control board 40 is broken down, a control error is caused, and therefore, breakdown can be sensed and the outdoor control board 40 can be replaced with the new outdoor control board. On the other hand, for the NFC board 50, breakdown can be sensed in, e.g., a case where an attempt is made to make connection with the communication terminal 60, but such connection is difficult to be made or it is difficult to change the setting information. For this reason, it is difficult to sense breakdown as long as connection with the communication terminal 60 is not made.

For the DIP switch 44 and the rotary switch 45 in the case of replacing the outdoor control board 40, the states of the switches set for the broken outdoor control board 40 are visually checked so that these states can be reflected in the new outdoor control board. However, it is difficult to reflect the contents of the storage medium 41 in a storage medium of the new outdoor control board. Moreover, it is also difficult to reflect the contents of the setting information stored in the NFC board 50 in the storage medium of the new outdoor control board. The setting information stored in the NFC board 50 and the setting information set by, e.g., the DIP switch 44 reflect the setting information in the outdoor control board 40 before breakdown. As long as these pieces of information can be set as setting information (master information) for the operation control, the setting information in the outdoor control board 40 can be recovered to the state before breakdown.

For these reasons, the air-conditioning device 10 of the present embodiment is configured such that the setting information in the NFC board 50 and/or the setting information set by, e.g., the DIP switch 44 are/is settable as the master information in setting processing when the air-conditioning device 10 is powered on after the broken board has been replaced.

The setting processing upon power-on will be described in detail with reference to FIG. 5. The air-conditioning device 10 is powered on, and the processing starts from Step 300 accordingly. Power is applied in such a manner that an operation start button of the remote controller 13 is pressed down, for example. For starting the operation control, the outdoor control board 40 reads, in Step 301, the setting information necessary for the operation control from the storage medium 41. Moreover, the NFC board 50 is supplied with the power, and reads the setting information from the storage medium 51.

In Step 302, the NFC board 50 checks connection with the outdoor control board 40, and determines whether or not the outdoor control board 40 has been correctly recognized. According to the presence or absence of a response of correct recognition from the NFC board 50, the outdoor control board 40 determines whether or not communication with the NFC board 50 has been correctly made. In a case where it is determined that communication with the NFC board 50 has been correctly made, the processing proceeds to Step 303, and the outdoor control board 40 receives the setting information from the NFC board 50. That is, the NFC board 50 transmits the setting information read from the storage medium 51 to the outdoor control board 40. As described above, the NFC board 50 determines whether or not communication with the outdoor control board 40 is available, and in a case where it is determined as communicable, transmits the setting information stored in the storage medium 51 to the outdoor control board 40.

In Step 304, the outdoor control board 40 compares the setting information in the NFC board 50 and the setting information in the outdoor control board 40 with each other, and determines whether or not these pieces of setting information are different from each other. A case where there is a difference in the setting information includes, for example, a case where the outdoor control board 40 has been replaced. In a case where it is determined that both pieces of setting information are different from each other, the processing proceeds to Step 305, and the outdoor control board 40 sets the setting information in the NFC board 50 as the master information and ends the processing in Step 309. The master information is, for example, set in such a manner that the setting information targeted for setting is written in the storage medium 41 of the outdoor control board 40. Accordingly, the outdoor control board 40 can recover the setting information with the setting information before board replacement stored in the outdoor control board 40. As described above, the outdoor control board 40 determines whether or not the setting information stored in the storage medium 41 and the setting information received from the NFC board 50 are different from each other, and in a case where it is determined that these pieces of information are different from each other, sets the setting information received from the NFC board 50 as the setting information used for the operation control of the air-conditioning device 10.

In a case where the outdoor control board 40 determines in Step 302 that communication with the NFC board 50 is not correctly made or a case where the outdoor control board 40 determines in Step 304 that both pieces of setting information described above are the same as each other, the processing proceeds to Step 306. In this step, the outdoor control board 40 compares the setting information in the outdoor control board 40 and the setting information (a DSW setting) set by, e.g., the DIP switch 44 with each other, thereby determining whether or not both pieces of setting information are different from each other. In a case where communication with the NFC board 50 is not correctly made in Step 302, communication between the outdoor control board 40 and the NFC board 50 is not correctly made, and therefore, it is difficult for the outdoor control board 40 to acquire the setting information from the NFC board 50. Thus, the outdoor control board 40 uses the DSW setting as a comparison target. In a case where both pieces of setting information are the same as each other in Step 306, the outdoor control board 40 is only required to use the setting information in the outdoor control board 40 itself.

In a case where it is determined in Step 306 that both pieces of setting information are different from each other, the processing proceeds to Step 307, and the outdoor control board 40 sets the setting information set by, e.g., the DIP switch 44 as the master information and ends the processing in Step 309. A case where both pieces of setting information are different from each other includes, for example, a case where the outdoor control board 40 has been replaced.

In a case where it is determined in Step 306 that both pieces of setting information are the same as each other, the processing proceeds to Step 308, and the outdoor control board 40 sets the setting information read from the storage medium 41 of the outdoor control board 40 as the master information and ends the processing in Step 309. In this case, the setting information has already been stored in the storage medium 41, and therefore, the outdoor control board 40 does not need to newly write the setting information.

As described above, in a case where the outdoor control board 40 determines that the setting information stored in the storage medium 41 and the setting information received from the NFC board 50 are the same as each other, the outdoor control board 40 determines whether or not the setting information stored in the storage medium 41 and the DSW setting are different from each other. In a case where it is determined that these pieces of information are different from each other, the DSW setting is set as the setting information used for the operation control of the air-conditioning device 10.

Figure 5:
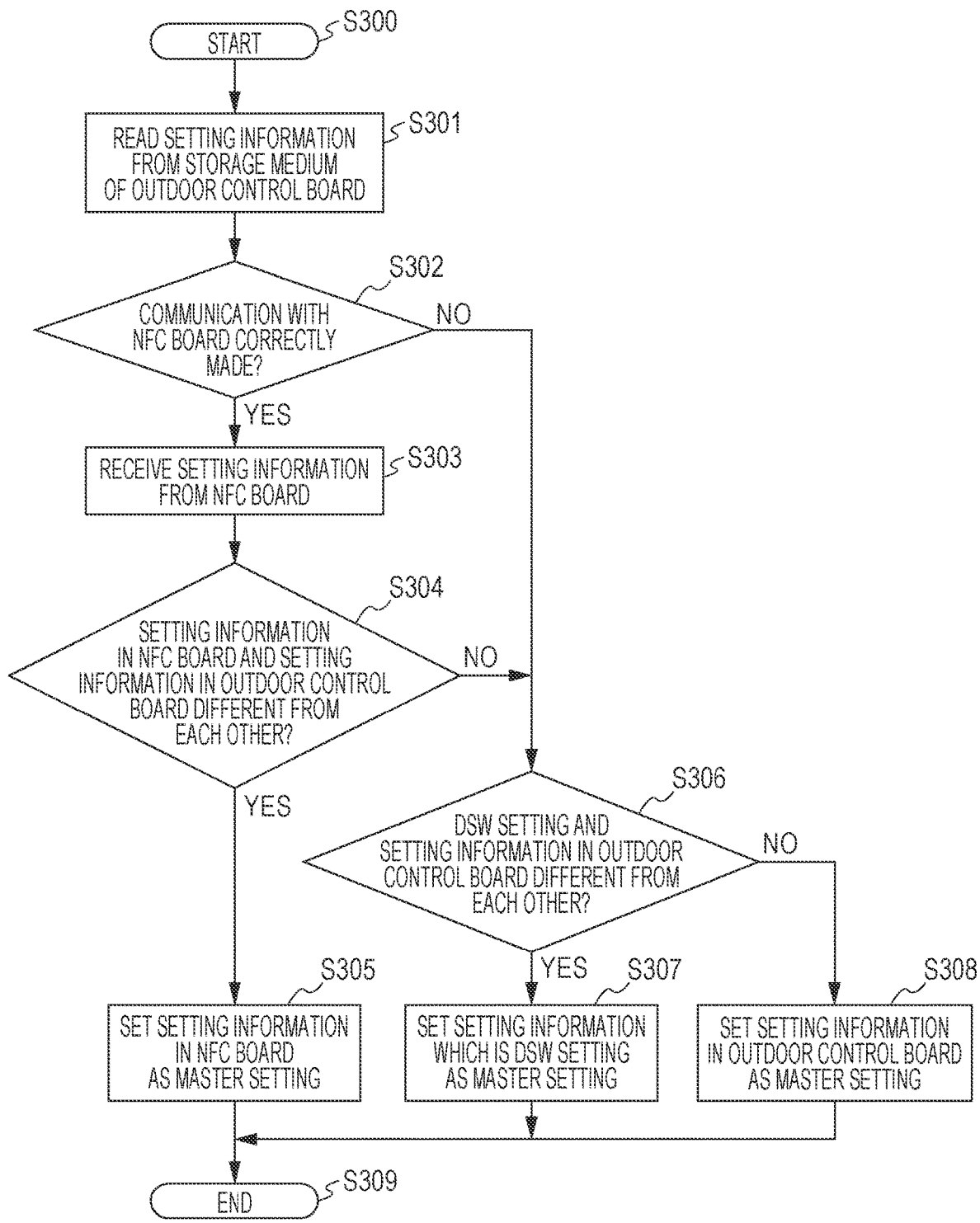

A case where both pieces of setting information are different from each other in Step 304 or Step 306 shown in FIG. 5 is caused in a case where the outdoor control board 40 has been replaced. For this reason, the processing upon replacement of the outdoor control board 40 will be described in detail with reference to FIGS. 6A to 6D.

Figure 6A:
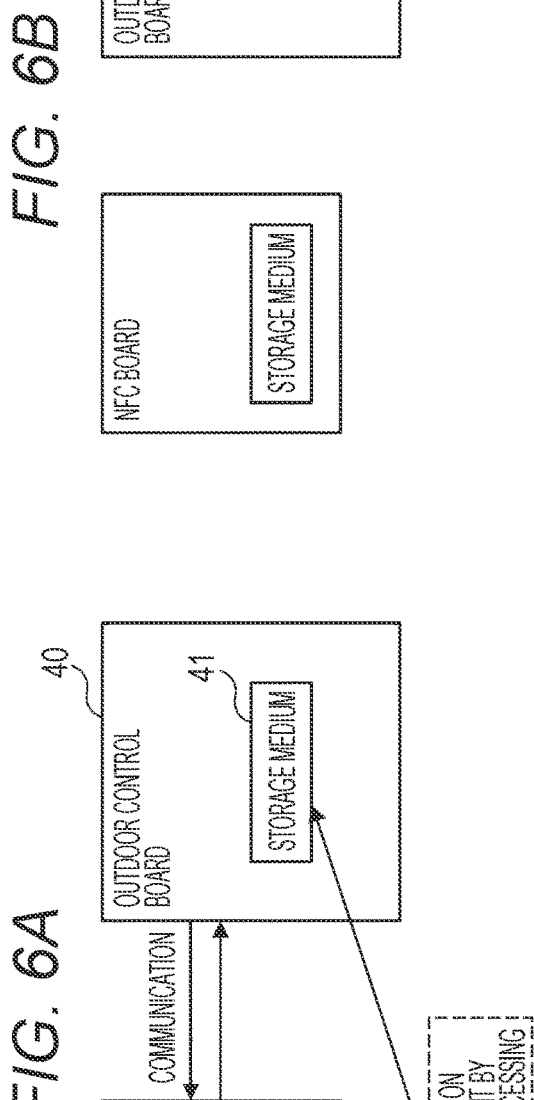
FIGS. 6A to 6D are diagrams for describing processing upon replacement of an outdoor control board.

As shown in FIG. 6A, the synchronization processing is executed during power distribution. During power distribution, the synchronization processing is executed upon a setting change or at a certain time interval. Thus, the setting information in the outdoor control board 40 and the setting information in the NFC board 50 are coincident with each other. Even if the setting information in the outdoor control board 40 has been changed by, e.g., the DIP switch 44, the changed setting information is transmitted to the NFC board 50, and the setting information in the NFC board 50 is changed accordingly. Thus, the setting information in the outdoor control board 40 and the setting information in the NFC board 50 are the same as each other. In a case where the setting information in the NFC board 50 has been changed by the communication terminal 60, the changed setting information is transmitted to the outdoor control board 40, and the setting information in the outdoor control board 40 is changed accordingly. Thus, the setting information in the outdoor control board 40 and the setting information in the NFC board 50 are the same as each other.

Figure 6B:
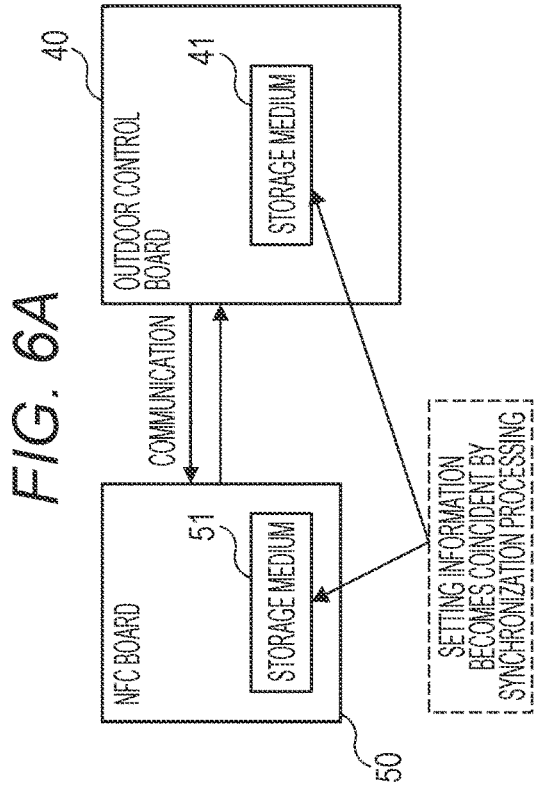

In a case where the outdoor control board 40 is broken down for some reasons during power distribution, the synchronization processing is no longer executed as shown in FIG. 6B. Upon breakdown, operation is uncontrollable, and such breakdown is notified to the user by, e.g., displaying of an error. Thus, the user recognizes that the outdoor control board 40 needs to be replaced.

Figure 6C:
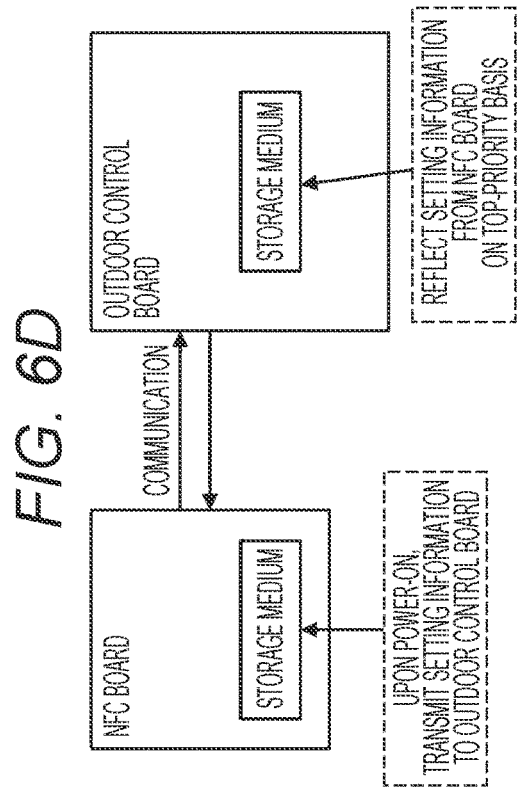

As shown in FIG. 6C, after replacement of the outdoor control board 40, the setting information before board replacement is stored in the storage medium 51 of the NFC board 50, and on the other hand, the storage medium 41 of the outdoor control board 40 after replacement is in the state at the time of shipping from the factory. For this reason, the pieces of setting information stored in both storage media are different from each other.

Figure 6D:
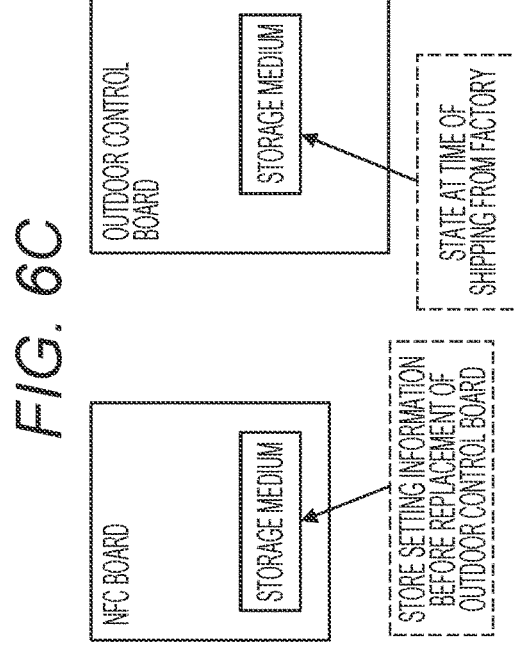

When the air-conditioning device 10 is first powered on after replacement of the outdoor control board 40, the setting information before board replacement is transmitted from the NFC board 50 to the replaced outdoor control board 40, as shown in FIG. 6D. The outdoor control board 40 stores the setting information from the NFC board 50 in the storage medium 41 of the outdoor control board 40 itself, and reflects such setting information on a top-priority basis. Accordingly, the outdoor control board 40 can recover the setting information with the setting information before board replacement stored in the outdoor control board 40.

The example shown in FIGS. 6A to 6D is the example in a case where the outdoor control board 40 is broken down, but in some cases, the NFC board 50 might be broken down. The processing in a case where the NFC board 50 is broken down and replaced will be described with reference to FIGS. 7A to 7D.

As shown in FIG. 6A, the synchronization processing is executed during power distribution. During power distribution, the synchronization processing is executed upon a setting change or at a certain time interval. Thus, the setting information in the outdoor control board 40 and the setting information in the NFC board 50 are coincident with each other.

Figure 7A:
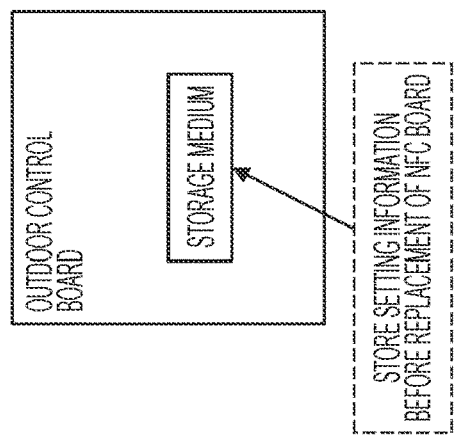
FIGS. 7A to 7D are diagrams for describing processing upon replacement of an NFC board.

In a case where the NFC board 50 is broken down for some reasons during power distribution, the synchronization processing is no longer executed as shown in FIG. 7A. Normally, the user can communicate with the NFC board 50 by means of the communication terminal 60. However, when the NFC board 50 is broken down, it is difficult to make communication between the communication terminal 60 and the NFC board 50. Thus, the user recognizes that the NFC board 50 is broken down.

Figure 7B:
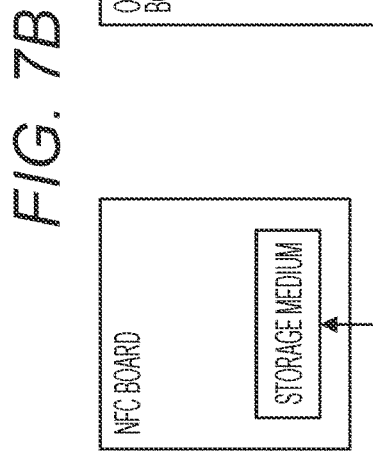

As shown in FIG. 7B, after replacement of the NFC board 50, the setting information before board replacement is stored in the storage medium 41 of the outdoor control board 40, and on the other hand, the storage medium 51 of the replaced NFC board 50 has an initial setting (an initial value of 0). Thus, the pieces of setting information stored in both storage media are different from each other.

Figure 7C:
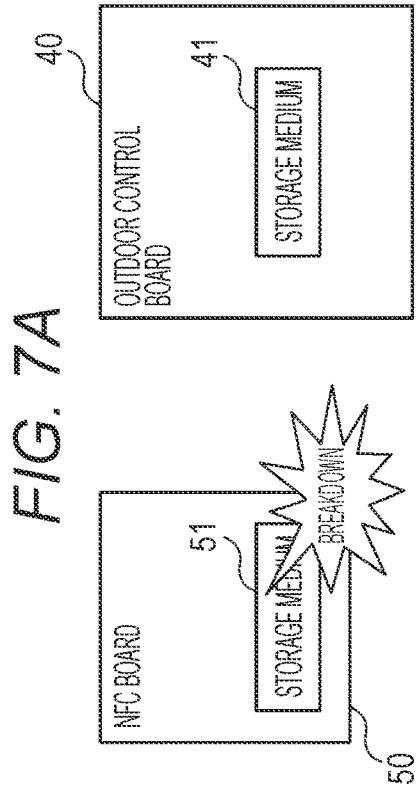

As in the case of replacing the outdoor control board 40, when the air-conditioning device 10 is first powered on after replacement of the NFC board 50, the setting information is transmitted from the NFC board 50 to the outdoor control board 40, as shown in FIG. 7C. In this case, the outdoor control board 40 determines whether or not there is no value as a predetermined set value in the received setting information (a set value is 0), and in a case where there is no value, determines that the setting information transmitted from the NFC board 50 is the initial setting. The predetermined set value (specific information) may include, for example, a set value for a model setting. In a case where the set value for the model setting is 0, an alarm is issued, and therefore, the user does not set 0 purposefully. Thus, the outdoor control board 40 refers to such a value so that the outdoor control board 40 can determine whether or not the setting information transmitted from the NFC board 50 is the initial setting.

Figure 7D:
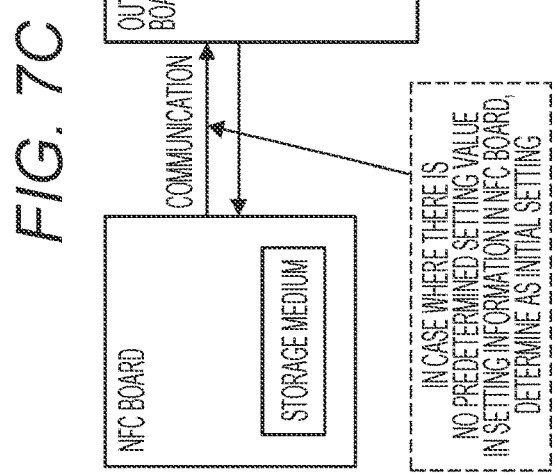

In a case where it is determined that the setting information transmitted from the NFC board 50 is the initial setting, the outdoor control board 40 does not write the received setting information (the setting information transmitted from the NFC board 50) in the storage medium 41 of the outdoor control board 40 itself. Then, as shown in FIG. 7D, the outdoor control board 40 transmits the setting information stored in the storage medium 41 of the outdoor control board 40 itself to the NFC board 50. The NFC board 50 writes the received setting information in the storage medium 51 of the NFC board 50 itself, and in this manner, recovers the setting information before board replacement as the setting information in the NFC board 50 itself.

Note that after recovery, the setting in the NFC board 50 can be changed by the communication terminal 60 and the setting in the outdoor control board 40 can be changed by, e.g., the DIP switch 44, needless to say.

As described above, the outdoor control board 40 determines, based on the specific information in the setting information received from the NFC board 50, whether or not the setting information received from the NFC board 50 is set as the setting information used for the operation control of the air-conditioning device 10, and in a case where it is determined as the setting information being not set, the setting information stored in the storage medium 41 is set as the setting information used for the operation control of the air-conditioning device 10.

As described so far, in the present embodiment, in a case where the board has been replaced, the setting information before replacement can be automatically recovered as the setting information in the board. Thus, the trouble of setting the information again can be avoided, and erroneous reading of the setting of the broken board and erroneous setting can be reduced. Moreover, even in a case where the setting of the outdoor control board 40 needs to be changed after board replacement, the setting of the NFC board 50 is changed using the external equipment so that the changed setting can be reflected in the outdoor control board 40 by the subsequent synchronization processing.

The control device, the heat exchange system, and the program of the present embodiment have been described so far in detail with reference to the embodiment. Note that the technique of the present disclosure is not limited to the above-described embodiment. Other embodiments and any aspect including embodiments to which additions, changes, omissions, and the like are made and which are corrected within a scope conceivable by those skilled in the art are included in the technical scope of the present disclosure as long as the features and advantageous effects of the present disclosure can be provided.

For example, the outdoor control board 40 and the NFC board 50 are not necessarily separated from each other, and may be provided on the same board. In this case, if any of the storage medium 41, the CPU 42, and the communication unit 43 or a line connecting therebetween is broken down, i.e., a component for controlling the air-conditioning device 10 is broken down, the process of replacing such a broken portion with a new component is also included in replacement of the outdoor control board 40 as described herein.

In a case where any of the storage medium 51, the CPU 52, the communication unit 53, and the NFC antenna 54 or a line connecting therebetween is broken down, i.e., a component for storing the setting information is broken down, the process of replacing such a broken portion with a new component is also included in replacement of the NFC board 50 as described herein.

The DIP switch 44 and the rotary switch 45 may be provided outside the outdoor control board 40.

The case of replacing the board is not limited to a case where it is difficult to execute the synchronization processing between the outdoor control board 40 and the NFC board 50, and includes various cases such as a case where a component forming the outdoor control board 40 or the NFC board 50 is broken down and a case where a certain period of time has elapsed.

The storage medium 41 and the storage medium 51 are also a recording medium recording a first program causing a computer (the outdoor control board 40, the NFC board 50) to execute the operation control of the air-conditioning device 10 as a heat exchange system configured to exchange heat between fluid and a heat medium. In this case, the computer includes the storage medium 41 and the storage medium 51 configured to store the setting information used for the operation control of the heat exchange system. The storage medium 41 is included in the outdoor control board 40 as a controller configured to execute the operation control by means of the setting information. The storage medium 51 is included in the NFC board 50 as a communicator configured to communicate with the external equipment. The outdoor control board 40 and the NFC board 50 are mounted on the same outdoor unit 12, the same indoor unit 11, or the same central control panel. The first program causes the computer to execute the step of executing the synchronization processing between the setting information stored in the storage medium 41 and the setting information stored in the storage medium 51 and the step of changing the setting information stored in the storage medium 51 in response to a request from the external equipment. The step of executing the synchronization processing includes the step of transmitting, after the setting information stored in the storage medium 51 has been changed, the changed setting information to the storage medium 41.

The storage medium 41 and the storage medium 51 are also a recording medium recording a second program causing a computer (the outdoor control board 40, the NFC board 50) to execute the operation control of the air-conditioning device 10 as a heat exchange system configured to exchange heat between fluid and a heat medium. The computer includes the storage medium 41 and the storage medium 51 configured to store the setting information used for the operation control of the heat exchange system. The storage medium 41 is included in the outdoor control board 40 as a controller configured to execute the operation control by means of the setting information. The storage medium 51 is included in the NFC board 50 as a communicator configured to communicate with the external equipment. The second program causes the computer to execute the step of executing the synchronization processing between the setting information stored in the storage medium 41 and the setting information stored in the storage medium 51 and the step of changing the setting information stored in the storage medium 51 in response to a request from the external equipment. The step of executing the synchronization processing includes the step of transmitting, after the setting information stored in the storage medium 51 has been changed, the changed setting information to the storage medium 41, or the step of transmitting the setting information stored in the storage medium 41 at least from the storage medium 41 of the controller to the storage medium 51 of the communicator.

The storage medium 41 and the storage medium 51 can be read by the computer, and for example, are a non-transient recording medium capable of holding recorded contents even if a power supply is shut down. For example, a hard disk drive, a solid state drive, a flash ROM, or a detachable USB memory may be used as the storage medium 41 and the storage medium 51. The computer can read the first program or the second program recorded in the storage medium 41 and the storage medium 51, thereby executing the first program or the second program.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A control device comprising:
a controller including a first storage medium configured to store setting information used for operation control of a heat exchange system configured to exchange heat between fluid and a heat medium, the controller being configured to execute the operation control by use of the setting information; and
a communicator including a second storage medium configured to store setting information used for the operation control, the communicator being configured to communicate with external equipment,
wherein the controller and the communicator are mounted on an identical outdoor unit, an identical indoor unit, or an identical central control panel,
the controller and the communicator execute synchronization processing between the setting information stored in the first storage medium and the setting information stored in the second storage medium, and
in a case where the setting information stored in the second storage medium has been changed in response to a request from the external equipment, the communicator transmits the changed setting information to the controller in the synchronization processing,
wherein:
the communicator transmits the setting information stored in the second storage medium to the controller in response to power-on of the heat exchange system,
the controller determines whether or not the setting information stored in the first storage medium and the setting information received from the communicator are different from each other, and in a case where the setting information stored in the first storage medium and the setting information received from the communicator are different from each other, sets the setting information received from the communicator as setting information used for the operation control of the heat exchange system, and
the controller
includes one or more switches capable of setting setting information used for the operation control, and
in a case where it is determined that the setting information stored in the first storage medium and the setting information received from the communicator are identical to each other, determines whether or not the setting information stored in the first storage medium and the setting information set by the one or more switches are different from each other, and in a case where the setting information stored in the first storage medium and the setting information set by the one or more switches are different from each other, sets the setting information set by the one or more switches, as the setting information used for the operation control of the heat exchange system.

2. The control device according to claim 1, wherein
the communicator determines whether or not the communicator is communicable with the controller, and in a case where it is determined as communicable, transmits the setting information stored in the second storage medium to the controller.

3. The control device according to claim 1, wherein
the controller determines, based on specific information in the setting information received from the communicator, whether or not the setting information received from the communicator is set as setting information used for the operation control of the heat exchange system, and in a case where it is determined as the setting information being not set, sets the setting information stored in the first storage medium as the setting information used for the operation control of the heat exchange system.

4. The control device according to claim 1, wherein
the controller and the communicator execute the synchronization processing, in a case where the setting information in any of the controller and the communicator has been changed, or at a certain time interval.

5. A heat exchange system comprising:
the control device according to claim 1,
wherein the heat exchange system is configured to exchange heat between fluid and a heat medium, and
operation of the heat exchange system is controlled by the control device.

6. A control device comprising:
a controller including a first storage medium configured to store setting information used for operation control of a heat exchange system configured to exchange heat between fluid and a heat medium, the controller being configured to execute the operation control by use of the setting information; and
a communicator including a second storage medium configured to store setting information used for the operation control, the communicator being configured to communicate with external equipment,
wherein the controller and the communicator execute synchronization processing between the setting information stored in the first storage medium and the setting information stored in the second storage medium, and in the synchronization processing, the setting information stored in the first storage medium is transmitted at least from the first storage medium of the controller to the second storage medium of the communicator, and
in a case where the setting information stored in the second storage medium has been changed in response to a request from the external equipment, the communicator transmits the changed setting information to the controller in the synchronization processing,
wherein:
the communicator transmits the setting information stored in the second storage medium to the controller in response to power-on of the heat exchange system,
the controller determines whether or not the setting information stored in the first storage medium and the setting information received from the communicator are different from each other, and in a case where the setting information stored in the first storage medium and the setting information received from the communicator are different from each other, sets the setting information received from the communicator as setting information used for the operation control of the heat exchange system, and
the controller
includes one or more switches capable of setting setting information used for the operation control, and
in a case where it is determined that the setting information stored in the first storage medium and the setting information received from the communicator are identical to each other, determines whether or not the setting information stored in the first storage medium and the setting information set by the one or more switches are different from each other, and in a case where the setting information stored in the first storage medium and the setting information set by the one or more switches are different from each other, sets the setting information set by the one or more switches, as the setting information used for the operation control of the heat exchange system.

7. The control device according to claim 6, wherein the communicator determines whether or not the communicator is communicable with the controller, and in a case where it is determined as communicable, transmits the setting information stored in the second storage medium to the controller.

8. The control device according to claim 6, wherein the controller determines, based on specific information in the setting information received from the communicator, whether or not the setting information received from the communicator is set as setting information used for the operation control of the heat exchange system, and in a case where it is determined as the setting information being not set, sets the setting information stored in the first storage medium as the setting information used for the operation control of the heat exchange system.

9. The control device according to claim 6, wherein the controller and the communicator execute the synchronization processing, in a case where the setting information in any of the controller and the communicator has been changed, or at a certain time interval.

10. A heat exchange system comprising:
the control device according to claim 6,
wherein the heat exchange system is configured to exchange heat between fluid and a heat medium, and
operation of the heat exchange system is controlled by the control device.

11. A recording medium recording a program causing a computer to execute operation control of a heat exchange system configured to exchange heat between fluid and a heat medium,
wherein the computer includes first and second storage media configured to store setting information used for the operation control of the heat exchange system,
the first storage medium is included in a controller configured to execute the operation control by use of the setting information,
the second storage medium is included in a communicator configured to communicate with external equipment, and
the controller and the communicator are mounted on an identical outdoor unit, an identical indoor unit, or an identical central control panel, and the controller includes one or more switches capable of setting setting information used for the operation control,
wherein
the program causes the computer to execute a step of steps of
executing synchronization processing between the setting information stored in the first storage medium and the setting information stored in the second storage medium and a step of changing the setting information stored in the second storage medium in response to a request from the external equipment,
executing the synchronization processing includes a step of transmitting, after the setting information stored in the second storage medium has been changed, the changed setting information to the first storage medium, transmitting the setting information stored in the second storage medium to the controller in response to power-on of the heat exchange system,
determining whether or not the setting information stored in the first storage medium and the setting information received from the communicator are different from each other, and in a case where the setting information stored in the first storage medium and the setting information received from the communicator are different from each other, setting the setting information received from the communicator as setting information used for the operation control of the heat exchange system, and
in a case where it is determined that the setting information stored in the first storage medium and the setting information received from the communicator are identical to each other, determining whether or not the setting information stored in the first storage medium and the setting information set by the one or more switches are different from each other, and in a case where the setting information stored in the first storage medium and the setting information set by the one or more switches are different from each other, setting the setting information set by the one or more switches, as the setting information used for the operation control of the heat exchange system.

12. A recording medium recording a program causing a computer to execute operation control of a heat exchange system configured to exchange heat between fluid and a heat medium,
wherein the computer includes first and second storage media configured to store setting information used for the operation control of the heat exchange system,
the first storage medium is included in a controller configured to execute the operation control by use of the setting information,
the second storage medium is included in a communicator configured to communicate with external equipment, and
the controller includes one or more switches capable of setting setting information used for the operation control,
wherein
the program causes the computer to execute steps of
executing synchronization processing between the setting information stored in the first storage medium and the setting information stored in the second storage medium and a step of changing the setting information stored in the second storage medium in response to a request from the external equipment,
executing the synchronization processing including
transmitting, after the setting information stored in the second storage medium has been changed in response to the request from the external equipment, the changed setting information to the first storage medium,
transmitting the setting information stored in the first storage medium at least from the first storage medium of the controller to the second storage medium of the communicator,
transmitting the setting information stored in the second storage medium to the controller in response to power-on of the heat exchange system,
determining whether or not the setting information stored in the first storage medium and the setting information received from the communicator are different from each other, and in a case where the setting information stored in the first storage medium and the setting information received from the communicator are different from each other, setting the setting information received from the communicator as setting information used for the operation control of the heat exchange system, and in a case where it is determined that the setting information stored in the first storage medium and the setting information received from the communicator are identical to each other, determining whether or not the setting information stored in the first storage medium and the setting information set by the one or more switches are different from each other, and in a case where the setting information stored in the first storage medium and the setting information set by the one or more switches are different from each other, setting the setting information set by the one or more switches, as the setting information used for the operation control of the heat exchange system.

\* \* \* \* \*